United States Patent Office

2,761,834
SULFONATED METHYLOL ACRYLAMIDE POLYMERS AND THEIR PREPARATION

Tzeng-Jiueq Suen and Arthur M. Schiller, Stamford, Conn., assignors to American Cyanamid Company, New York, N. Y., a corporation of Maine No Drawing. Application June 20, 1952, Serial No. 294,725

11 Claims. (Cl. 252—8.5)

This invention relates to new and useful synthetic materials, to methods of preparing the same and to compositions containing the same. More particularly it relates to anionic polymers prepared from ingredients including (1) an acrylamide compound having the formula

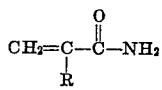

where R is a radical selected from the group consisting of hydrogen and the lower alkyl radicals containing from 1 to 4 carbon atoms and (2) formaldehyde and (3) a sulfurous acid compound selected from the group consisting of sulfurous acid and its water-soluble salts. The invention further relates to methods of preparing the above described polymers and to compositions containing said polymers.

It is an outstanding object of this invention to prepare a new class of synthetic materials, more particularly synthetic anionic and strongly hydrophilic polymers, which have particular utility as soil conditioners for the purpose of improving soil tilth, making the soil more porous and easier to work.

A further object of the invention is to prepare synthetic anionic and strongly hydrophilic polymers having utility as additives in oil well drilling fluids.

Another object of the invention is to provide economical and efficient methods by which the new synthetic materials described herein may be prepared.

Still another object of this invention is to prepare a new class of synthetic polymers which have particular utility in the coating and impregnating arts as such or as components of coating and impregnating compositions, or as intermediates in the preparation of other resinous materials which are especially suitable for use in such fields. These and other objects will be discussed more fully as a description of the invention proceeds.

The new synthetic polymers of this invention may be classed as anionic polymers of a sulfonated N-methylol acrylamide. More particularly, the anionic polymers of this invention may be described as essentially linear and containing a plurality of recurring units, at least about 5% of which recurring units have the probable general formula,

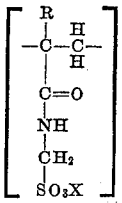

wherein R is selected from the group consisting of hydrogen and the lower alkyl radicals having from 1 to 4 carbon atoms and wherein X is a radical selected from the group consisting of alkali metal (i. e. sodium, potassium or lithium), ammonium, hydrogen and water soluble amines in combination with hydrogen. The new polymers are, for the most part, obtained in the form of aqueous solutions which may be dried to recover the solid polymers.

The nature of these new polymers may be better understood by illustrating the preparation of one of them. In the following illustration acrylamide was chosen to represent (1) the compound having the formula

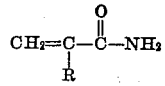

wherein R is selected from the group consisting of hydrogen and alkyl radicals having from 1 to 4 carbons atoms. Formaldehyde is the second ingredient of the polymer and sodium bisulfite was chosen to represent (3) the compound selected from the group consisting of sulfurous acid and its water-soluble salts. In a typical preparation one mol of acrylamide may be subjected to polymerizing conditions to form an essentially linear polymer having the formula,

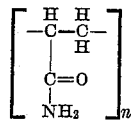

wherein $n=$the number of recurring units in the polymer.

The polymerized acrylamide may then be reacted with the formaldehyde in the proportion of one mol of formaldehyde to each monomer unit of the polymer. There is thereby formed a polymer of N-methylol acrylamide having the probable basic formula,

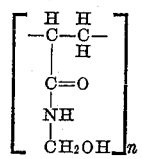

where $n=$the number of recurring units in the polymer.

The polymerized methylol acrylamide may then be reacted with the sodium bisulfite in the proportion of one mol of sodium bisulfite to each monomer unit of the polymer. The reaction takes place with the elimination of water to convert the structure of the polymer into one containing at least a substantial proportion of the following units:

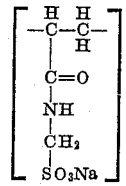

The above illustration is merely representative of one manner of preparation of our new polymers and is not to be construed as limitative. Many variations in the order of polymerizing and reacting and in the proportions of ingredients may be made. For example, instead of reacting the polymerized acrylamide compound with formaldehyde and then with the sulfurous acid compound, the polymerized acrylamide compound may be reacted simultaneously with the formaldehyde and the sulfurous acid compound. Alternatively the polymerized acrylamide compound may be reacted with the condensation product of formaldehyde and the sulfurous acid compound, for example, sodium formaldehyde bisulfite. As a further alternative, a monomeric acrylamide may be first reacted with formaldehyde and the resulting methylol acrylamide may be polymerized and then reacted with the sulfurous acid compound.

The ratio of the ingredients employed in the preparation of the new polymers may also be widely varied but within certain limits. The molar ratio of the formaldehyde to the acrylamide compound should be at least 0.05/1. It must be pointed out that the maximum quantity of formaldehyde that can react with the amide under the conditions to be used is only 1 mol per mol of the amide. A slight excess of formaldehyde present in the system up to 3 mols per mol of amide sometimes may prove beneficial in driving the reaction forward according to the mass action law, but a large excess of formaldehyde is wasteful and if not removed may even be harmful in some applications. The molar ratio of the sulfurous acid compound to the acrylamide compound should be at least 0.05/1. It should also be pointed out that the maximum quantity of the sulfurous acid compound that can react with the acrylamide compound is 1 mol per mol of combined formaldehyde in the form of the methylol group. In carrying out the reaction, a quantity of the sulfurous acid compound in reasonable excess of the formaldehyde, up to 5 mols per mol of formaldehyde, may be used to drive the reaction forward, but the use of a large excess is uneconomical. It will thus be seen that by an observance of these ratios that at least about 5% of the recurring units of the ultimate polymer will have the probable formula

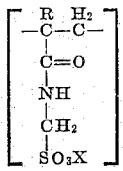

wherein R and X have the meanings ascribed above.

The methods of preparing our anionic polymers may follow any of the sequences of polymerization and reaction steps hereinabove described. Any of the various steps may be accomplished by simply mixing the reactants and allowing the reaction to proceed. Though not necessary, a mild heating is generally desirable in order to attain a commercially practicable speed of reaction. A temperature of from 30° C. to 100° C. will normally provide an adequate reaction speed in any of the steps and this represents the preferred temperature range. Generally for the purposes of convenience and economy, the various polymerization and reaction steps are performed in aqueous medium resulting in an aqueous solution of polymer as the final product. The solid polymer may be recovered from the aqueous solution, if desired, by any conventional drying operation, e. g., spray drying, or by precipitation with solvents in which the polymer is insoluble.

The polymerization of the acrylamide compound, either before or after its conversion into an N-methylol acrylamide, may be conveniently accomplished by heating the monomer in aqueous solution or dispersion under acid or alkaline conditions preferably at a pH of 2–11 in the presence of 0.1 to 5% of a suitable catalyst. One method of polymerizing acrylamide and α-methylacrylamide is described in U. S. Patent No. 2,486,191. In that patent, acrylamide is polymerized in aqueous solution in the presence of 5 to 40% of a water-miscible alcohol such as ethyl alcohol, isopropyl alcohol and the like. In this manner, and as is shown in some of the examples given herein, polymers of controlled molecular weight may be obtained according to the percentage of alcohol employed. The preferred catalysts include the various water-soluble peroxygen compounds such as, for example, hydrogen peroxide, alkali metal persulfates, e. g., potassium persulfate, alkali metal perborates, e. g., sodium perborate, urea peroxide and metal peroxides, e. g., sodium and potassium peroxides.

When the starting material for our process is an acrylamide of relatively low water solubility, e. g., α-propyl or α-butyl acrylamide, an emulsifying agent may be employed in the polymerization step to assure intimate contact between monomer and catalyst. In such cases water solubility is later achieved through reaction of the polymer with the aldehyde and the sulfurous acid compound. Examples of emulsifying agents which may be used are the diamyl, dihexyl, or dioctyl sulfo-succinic esters and salts thereof, salts of alkylated naphthalene sulfonic acids, sulfonated of sulfated high alcohols, e. g., lauryl sulfate, the salts of the sulfonated or sulfated higher alcohols, e. g., lauryl sulfate, the salts of the sulfonated or sulfated higher alcohols, sulfonated oils, glycol oleates and linoleates, mineral oil sulfonates, aromatic sulfonates, alkali soaps, triethanolamine soaps and the like. The amount of emulsifying agent used is generally about 1 to 5% by weight of the monomer.

The polymerization of the acrylamide compound after reaction with the aldehyde and formation of a methylol derivative may be accomplished in a similar manner, that is, by heating in aqueous medium under acid or alkaline conditions in the presence of a suitable catalyst.

The condensation reaction between the formaldehyde and the acrylamide compound (either before or after polymerization) is effected merely by mixing the two components in the desired proportions under either alkaline or acid conditions but preferably at a pH of 6 to 11. The preferred temperature may vary between 20° C. and 100° C. Similarly when the polymerized acrylamide compound is reacted simultaneously with the aldehyde and the sulfurous acid compound, the reaction may be effected by simply mixing the ingredients, preferably in aqueous medium. The temperature may also vary between 20° and 100° C. Like considerations apply when the polyacrylamide is reacted with the condensation product of formaldehyde with the sulfurous acid compound. The latter reaction will likewise take place upon mere mixing of the ingredients. It is preferred, however, to perform the reaction in aqueous medium at a temperature of from 20° C. to 100° C.

As stated previously, the acrylamide component of our polymers is a compound having the formula

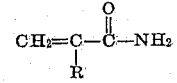

wherein R is hydrogen or a lower alkyl radical having from 1 to 4 carbon atoms. Thus R may be any of the radicals methyl, ethyl, propyl and butyl including secondary and tertiary radicals.

Instead of formaldehyde we may employ a compound engendering formaldehyde, for example paraformaldehyde and hexamethylenetetramine.

As the compound selected from sulfurous acid and its water-soluble salts, it is preferred to employ in most instances salts of the alkali metals. From the standpoint of cost and availability, sodium salts, especially commercial sodium metabisulfite, are particularly useful. Each mol of $Na_2S_2O_5$ is equivalent to two mols of $NaHSO_3$. Thus, the number of mols of $NaHSO_3$ required for a given reaction is supplied by using only half that number of mols of $Na_2S_2O_5$. In addition to using the alkali metal salts, we may also use ammonium and tertiary amine salts of sulfurous acid, such as ammonium bisulfite or trimethylamine sulfite.

The following examples are given by way of illustration and not by way of limitation. Parts are by weight unless otherwise specified.

*Example 1*

Into a reaction vessel equipped with an agitator, a thermometer and reflux condenser was placed 101 parts (0.1 mol) of a 10% aqueous solution of N-methylol acrylamide (prepared by the reaction of acrylamide and formaldehyde in equimolar proportions). The solution was heated with stirring to 70° C. and 0.03 part of potassium persulfate was added. Upon continued heating and stirring for approximately one hour, the solution gradually thickened to a viscosity in excess of 20,000 centipoises as the formation of polymer progressed. The resulting solution was cooled and 9.5 parts of sodium metabisulfite (0.1 mol of $SO_2$) dissolved in 126 parts of water was added. The mixture was stirred for 60 minutes at room temperature. The resulting product was a relatively colorless, viscous solution.

*Example 2*

Fifty and one-half (50.5) parts of acrylamide and 440 parts of deionized water were charged into a reaction vessel equipped with a stirrer, a thermometer, and reflux condenser. The solution was heated to 70° C. and 5 parts of potassium persulfate dissolved in 10 parts of water are then added. Polymerization was effected by stirring and heating at a temperature of 75–80° C. for 2 hours. The resulting polyacrylamide solution had a Brookfield viscosity of 1320 centipoises at 25° C. 252.5 parts of the polyacrylamide solution was then placed in a separate reaction vessel. There was added to this 38 parts of sodium formaldehyde bisulfite (monohydrate) and 297 parts of deionized water. Reaction was effected by stirring and heating at a pH of 9.9 and a temperature of 68–70° C. for 2½ hours. There was obtained a clear viscous solution of the polymer. A portion of the solution was subjected to spray drying for removal of water. The dried solid was a fine, white powder.

*Example 3*

One hundred and twenty-one (121) parts of a 16.7% solution of N-methylol acrylamide (0.2 mol) (obtained by reaction of formaldehyde and acrylamide in equimolar proportions) was charged into a reaction vessel along with 1 part isopropanol, 70 parts of deionized water and 0.21 part of trisodium phosphate. The mixture was heated to 70° C. and 0.04 part of potassium persulfate dissolved in 10 parts of water was added. The mixture was then heated with agitation at 80° C. for 60 minutes. The resulting polymethylolacrylamide solution had a Brookfield viscosity of 277 centipoises at 25° C. 101 parts of the thus prepared polymethylolacrylamide solution was mixed in a reaction vessel with 9.5 parts of sodium metabisulfite (0.1 mol $SO_2$) dissolved in 76.5 parts of water. Reaction was effected by stirring and heating at 50–55° C. for 60 minutes. The product was a clear, viscous solution.

*Example 4*

Two hundred (200) parts of acrylamide and 1780 parts of deionized water were charged into a reaction vessel equipped with a stirrer and reflux condenser. The mixture was heated to 70° C. and 5 parts of isopropanol and a solution of 0.36 part of potassium persulfate in 20 parts of water were added. The polymerization was effected by agitating and heating at 77–80° C. for 2 hours. The polymer solution thus prepared had a Brookfield viscosity of 31,300 centipoises at 25° C. and a pH of 6.5.

355 parts of the polymer solution (equivalent to 0.5 mol of monomer) was charged into a separate reaction vessel. 40.5 parts of 37% formalin (0.5 mol) and 108 parts of deionized water were then added. The reaction mixture was heated to 45° C. and maintained at approximately that temperature for a period of 90 minutes. Thereafter a solution of 24 parts of sodium metabisulfite (0.25 mol $SO_2$) in 960 parts of deionized water was added and the mixture was heated to 75° C. for 20 minutes. There was obtained a viscous solution of anionic polymer.

*Example 5*

Example 4 is repeated using an equivalent quantity of α-methacrylamide in place of acrylamide. A clear, viscous product is obtained.

*Example 6*

One hundred and seventy-seven (177) parts of a polyacrylamide solution (equivalent to 0.25 mol of monomer) prepared as in Example 4 was charged into a reaction vessel. The pH was adjusted to 10.2 by the addition of 1.2 parts of trisodium phosphate. There were then added 20.3 parts of 37% formalin (0.25 mol) and 17.9 parts of sodium metabisulfite (0.19 mol of $SO_2$). The mixture was heated with stirring to 50° C. and maintained at approximately that temperature for 2 hours. The resulting product was a clear, viscous solution.

*Example 7*

Four parts of sulfur dioxide (0.063 mol) was introduced into 20.3 parts of 37% formalin (0.25 mol) in a suitable reaction vessel. The resulting solution was added to 177.5 parts of a 10% polyacrylamide (equivalent to 0.25 mol of monomer) solution. 200 parts of deionized water was then added. The resulting mixture was heated at 45–50° C. for 30 minutes and then cooled. The pH of the solution was 1.2. The product was a clear, water-white, viscous solution.

*Example 8*

One hundred and one (101) parts of a 10% polymethylol acrylamide (equivalent to 0.1 mol of monomer) and 192 parts deionized water were charged into a reaction vessel. 4.75 parts of sodium metabisulfite (0.05 mol $SO_2$) and 4 parts of a 20% sodium hydroxide solution were then added. The pH of the reaction mixture was 8.1. The mixture was heated at 70°–75° C. for one hour and then cooled. The final pH of the solution was 12.1. The product was a clear, viscous solution.

*Example 9*

The procedure of Example 1 was followed with the exception that the 9.5 parts of sodium metabisulfite was replaced with 10.8 parts of ammonium bisulfite. Similar results were obtained.

The anionic and strongly hydrophilic polymers of this invention have been found to possess a variety of unusual and interesting properties. These properties enable the application of the polymers to a large number of useful and important purposes. One of the applications in which our anionic polymers is outstanding is that of an oil well drilling mud additive. When used as an additive in drilling muds our polymers markedly reduce the filtration loss. Furthermore, they are even effective in the presence of salt water or in the presence of added water-soluble salts. In order to demonstrate this property several tests were made according to the method described in the Bureau of Mines publication, RI–3556, Feb. 1941, entitled "Role of Clay and Other Minerals in Oil Well Drilling Fluids" by A. George Stern beginning on page 39. The polymer solutions employed in the tests were prepared according to the general procedure of Example 4 using varying molar ratios of acrylamide, formaldehyde, and sodium bisulfite and varying the degree of polymerization of the polymer by the addition of different amounts of isopropanol. The following table presents the data obtained:

| Molar Ratio, Acrylamide/HCHO/NaHSO₃ | Polymer Viscosity | Lbs. Dry Polymer added per Bbl. | Water Loss, ml.H₂0/30′ at 100 p. s. i. | Type Clay in Mud Slurry |
|---|---|---|---|---|
| 1/1/1 | high | 1 | 29 | Bentonite. |
| 1/1/0.5 | high | 1 | 23 | Do. |
| 1/1/0.5 | low | 1 | 24.3 | Do. |
| 1/1/0.5 | high | 0.2 | 32 | Do. |
| 1/1/0.5 | high | 0.5 | 30 | Do. |
| Control | | 0 | 50 | Do. |
| 1/1/0.5 | high | 1 | 38 | Attapalgus Clay +5% NaCl |
| 1/1/0.2 | high | 1 | 39 | Do. |
| 1/1/0.3 | high | 1 | 43 | Do. |
| Control | | 0 | 145 (ran dry) | Do. |

In general such drilling fluids comprise an inorganic solid suspending agent, e. g., clay, in the form of an aqueous suspension and from 0.05 to 2.5% by weight of a polymer of this invention. The drilling fluid may also contain from about 2 to 10% of a water-soluble salt of ammonium or an alkali metal, e. g., sodium chloride, sodium phosphate, ammonium chloride and the like.

A further and outstanding application of our new polymers is in the field of soil conditioning. It has been found that when the polymers are added to soil, the soil assumes an improved structure and becomes more porous and easier to work. Other incidental advantages also accrue to the soil such as greater resistance to erosion and greater moisture retention. The amount of polymer to be used as a soil conditioning agent will depend on the degree of soil aggregation desired, the type of soil and economic factors. The preferred amount is in the range of 0.01 to 2% based on the dry weight of the soil, but larger amounts such as 5% or more may be used if desired.

In order to demonstrate the effectiveness of our polymers as soil conditioning agents, a series of tests have been made by a method essentially the same as that described in the Journal of the American Society of Agronomy, volume 28, pages 337—350 (1936) in an article entitled "A Direct Method of Aggregate Analysis of Soils and a Study of the Physical Nature of Erosion Losses" by R. E. Yoder. The polymers employed in the tests were made according to the general procedure of Example 4 using varying molar ratios of acrylamide, formaldehyde, and sodium bisulfite. The viscosity of the polymers was controlled by varying the amount of isopropanol employed. The following table presents the data obtained:

| Molar Ratio, Acrylamide/HCHO/NaHSO$_3$ | Polymer Viscosity | Wt. Percent of Polymer dry basis | Percent Total Aggregates [1] >0.105 mm. | Percent Total Aggregates [1] >0.42 mm. |
|---|---|---|---|---|
| 1. 1/1/0.5 | high | 0.1 | 64.26 | 56.13 |
| 2. 1/1/0.25 | high | 0.1 | 57.81 | 51.57 |
| 3. 1/0.25/0.25 | high | 0.1 | 34.01 | 28.03 |
| 4. 1/1/0.5 | medium | 0.1 | 52.0 | |
| 5. Control (no polymer) | | 0 | 0 | 0 |

[1] All percentages based on dry weight of soil.

The polymers of this invention find many other useful applications. They may be used as sizing agents for paper or textiles, as impregnants for paper and textiles, as thickening agents for a variety of purposes, or as antistatic agents for films and sheets of natural or synthetic materials, as flotation and dispersing agents in mineral dressing, as suspension agent in conjunction with detergents as well as for many other purposes.

Many modifications may be made in both the polymers and processes described herein without departing from the spirit and scope of this invention. For example, various dyes and pigments, such as for instance, carbon black, iron blue, chrome yellow, lithopone, etc. may be incorporated into our anionic polymers. Similarly various plasticizers and/or fillers may be added to the polymers, if desired. Still other changes and modifications may be made as will be understood by persons skilled in the art.

Still within the scope of the invention, various permutations or combinations of the ingredients of the polymers may be made. For example, a mixture of different acrylamides may be employed as starting materials as likewise may be a combination or mixture of various water-soluble salts of sulfurous acid.

Our copending application Serial No. 294,724, filed concurrently describes and claims certain copolymers related to the polymers of this invention. The copolymers of said copending application are prepared by copolymerizing an N-methylol acrylamide with a comonomer having a CH$_2$=C< grouping and a boiling point of at least 60° C. and further reacting the thus-formed copolymer with a sulfurous acid compound selected from the group consisting of sulfurous acid and its water-soluble salts. The comonomer disclosed therein include styrene, alkyl acrylates, vinyl acetate, vinyl chloride, acrylonitrile and the like.

It is our intention to cover all changes and modifications of the examples of this invention herein chosen for purposes of the disclosure, which do not constitute departure from the spirit and scope of the invention.

We claim:

1. A synthetic anionic resinous composition comprising the product obtained by treating the homopolymer of the reaction product of an acrylamide compound having the formula

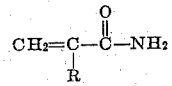

wherein "R" is selected from the group consisting of hydrogen and alkyl radicals having from 1 to 4 carbon atoms and formaldehyde, as the sole resin-forming reactants, with a sulfurous acid compound selected from the group consisting of sulfurous acid and its water-soluble salts, wherein the molar ratio of combined formaldehyde to acrylamide compound is from about 0.05/1 to 1/1, the molar ratio of combined sulfurous acid compound to acrylamide compound is from about 0.05/1 to 1/1 and the molar ratio of combined formaldehyde to combined sulfurous acid compound is at least about 1/1, respectively.

2. A synthetic anionic polymer according to claim 1 in which the acrylamide compound is acrylamide.

3. A synthetic anionic polymer according to claim 1 in which the sulfurous acid compound is sodium bisulfite.

4. A synthetic anionic polymer according to claim 1 in which the acrylamide compound is acrylamide and the sulfurous acid compound is sodium bisulfite.

5. A synthetic anionic polymer comprising the polymeric reaction product of equimolar proportions of polyacrylamide, formaldehyde and sodium bisulfite.

6. An oil well drilling fluid comprising an inorganic solid suspending agent, an aqueous dispersion medium and from 0.05 to 2.5% by weight of the polymer of claim 1.

7. A method of preparing a synthetic anionic polymer which comprises reacting an acrylamide compound having the formula

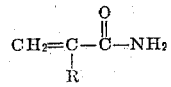

wherein "R" is selected from the group consisting of hydrogen and alkyl radicals having from 1 to 4 carbon atoms and formaldehyde in the ratio of at least 0.05 mol for each mol of acrylamide compound, homopolymerizing the resultant N-methylol acrylamide compound as the sole resin-forming reactant to form a polymer, and reacting said polymer with a sulfurous acid compound selected from the group consisting of sulfurous acid and its water-soluble salts, wherein said sulfurous acid compound is present in an amount of at least 0.05 mol for each recurring unit in the polymer.

8. A method according to claim 7 in which the acrylamide compound is acrylamide.

9. A method according to claim 7 in which the sulfurous acid compound is sodium bisulfite.

10. A method according to claim 7 in which the sulfurous acid compound is sodium bisulfite and the acrylamide compound is acrylamide.

11. The method according to claim 7 in which the reaction with formaldehyde follows the polymerization of the acrylamide compound.

References Cited in the file of this patent

UNITED STATES PATENTS

| | | |
|---|---|---|
| 2,395,347 | Sharkey | Feb. 19, 1946 |
| 2,576,839 | Jones | Nov. 27, 1951 |
| 2,680,110 | Loughran | June 1, 1954 |

OTHER REFERENCES

Whitmore: "Organic Chemistry," pages 174, 175 (1937).